United States Patent [19]
Kurpanek

[11] 3,878,412
[45] Apr. 15, 1975

[54] MAGNETO-MOTIVE RECIPROCATING DEVICE

[76] Inventor: Waldemar Helmut Kurpanek, 4 Dusseldorf 11, West Germany

[22] Filed: Sept. 19, 1973

[21] Appl. No.: 398,820

Related U.S. Application Data

[63] Continuation-in-part of Ser. No. 273,940, July 23, 1972, Pat. No. 3,768,051.

[52] U.S. Cl. ............... 310/24; 310/34; 310/35; 173/117; 83/576; 83/751; 30/117
[51] Int. Cl. ............................................ H02k 33/16
[58] Field of Search ........... 335/153, 207, 234, 230, 335/259, 264, 7, 236; 310/23, 24, 34, 35, 21, 22, 32, 33, 15; 148/105; 30/117; 83/575, 576, 577, 651.1, 751; 173/117

[56] References Cited
UNITED STATES PATENTS

| | | | |
|---|---|---|---|
| 1,945,015 | 1/1934 | Wurzback et al. | 310/29 |
| 2,708,245 | 5/1955 | Werner | 335/230 X |
| 2,847,845 | 8/1950 | Frank et al. | 30/117 X |
| 2,938,269 | 5/1960 | Nissen | 310/35 X |
| 3,130,334 | 4/1964 | Nowalt | 310/35 |
| 3,259,810 | 7/1966 | Williams | 335/234 |
| 3,424,578 | 1/1969 | Strnat et al. | 148/105 UX |
| 3,450,215 | 6/1969 | Emery | 173/117 |
| 3,460,081 | 8/1969 | Tillman | 335/234 |
| 3,514,674 | 5/1970 | Ito et al. | 335/234 X |
| 3,550,052 | 12/1970 | Toyoda | 335/234 |
| 3,570,353 | 3/1971 | Hess | 83/576 |
| 3,606,595 | 9/1971 | Takamizawa | 310/30 X |
| 3,703,653 | 11/1972 | Tracy et al. | 310/24 |

*Primary Examiner*—Donovan F. Duggan
*Attorney, Agent, or Firm*—Holman & Stern

[57] ABSTRACT

A magneto-motive reciprocating device having two permanent magnets rigidly mounted within a chamber so that the poles of one magnet face the poles of the other at a given distance to form an enclosed space therebetween. The facing poles are of opposite magnetic polarity so that a closed ring flux field is produced. A ferromagnetic piston reciprocably moves in the space between the magnets due to the action of an electro-magnetic coil surrounding the piston between the magnets. The ferromagnetic piston forms reciprocating motions under the effects of an alternating field provided by the electro-magnetic coil.

13 Claims, 5 Drawing Figures

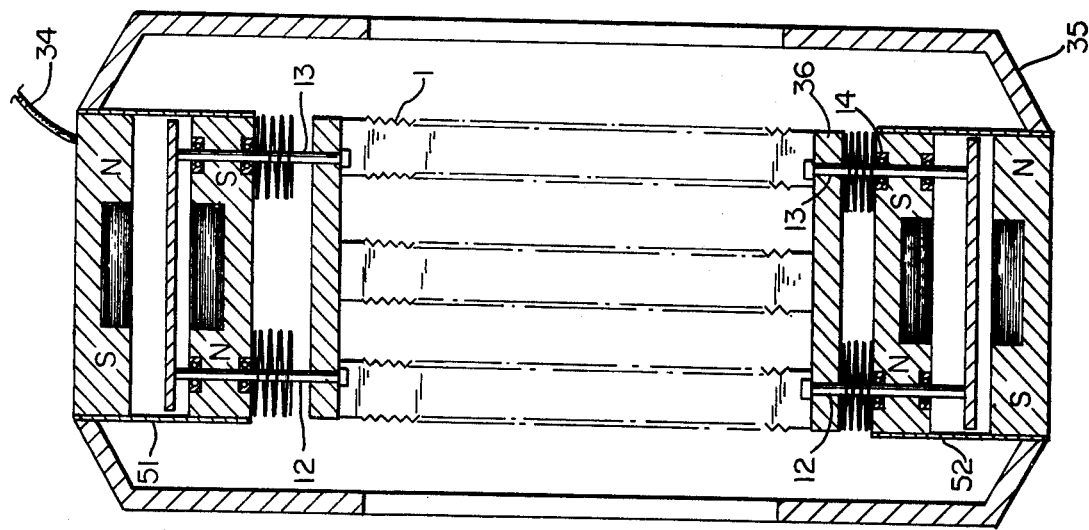
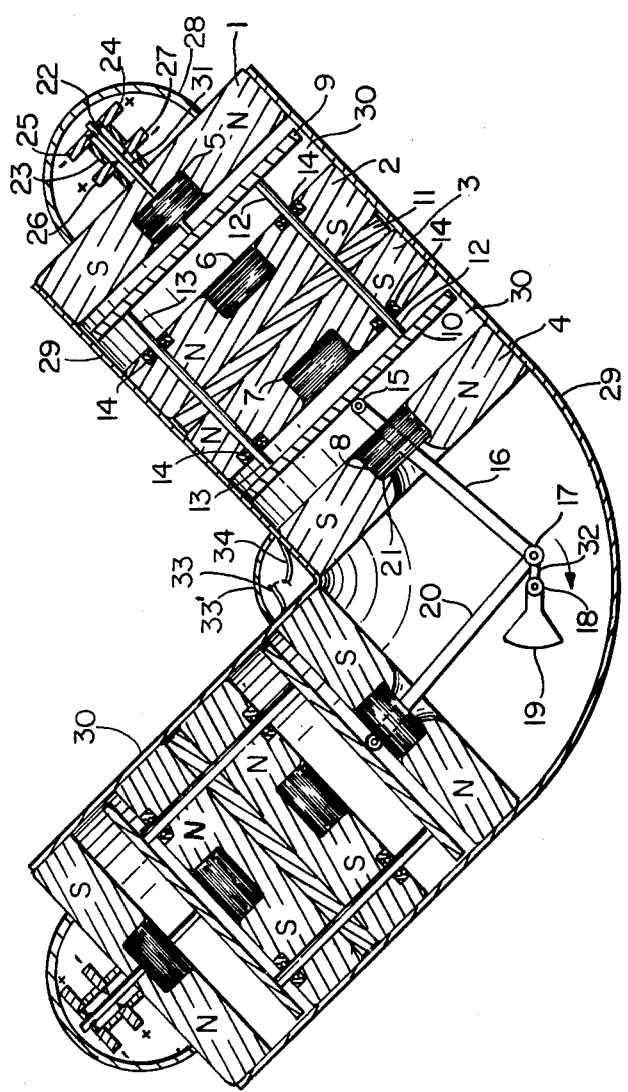
FIG. 3
FIG. 2

MAGNETO-MOTIVE RECIPROCATING DEVICE

PRIOR APPLICATION

This is a Continuation-in-Part application of U.S. Patent application Ser. No. 273,940, filed July 23, 1972 now U.S. Pat. No. 3,768,051.

BACKGROUND OF THE INVENTION

The present invention relates to magneto-motive devices and more particularly to a magneto-motive device having a reciprocating element associated therewith. Formerly known magneto-motive devices function by attracting an iron rod or the like into an energized electro-magnetic coil, thus utilizing the magnetic force of attraction only.

Furthermore, prior known devices suffer from the disadvantages encountered due to the arrangement of the magnetic field employed. For example, ordinary permanent magnets may be employed having poles of opposing polarity facing each other to thus produce a usable magnetic field therebetween. Additionally, such magnets may be mounted within an electro-magnetic coil whereby the coil produces a magnetic field of higher field strength than that produced by the magnets themselves and being applied in a different direction relative thereto. A further disadvantage resides in the fact that permanent magnets of the above type may be mounted within the vicinity of supply leads carrying high d.c. current or high frequency alternating current. All the above conditions of operation will eventually permanently impair the magnetized state of the permanent magnets and thus must be avoided.

It is therefore an object of the instant invention to provide a magneto-motive reciprocating device utilizing permanent magnets and vicinal electro-magnetic fields without encountering the above disadvantages.

It is further an object of the instant invention to provide a reciprocating magneto-motive motor utilizing permanent magnets and vicinal electro-magnetic fields superior to the previously known electro-magnetic motors. The magneto-motive reciprocating motor according to the instant invention functions in an opposite manner to the well-known rotating electric motor similar to the opposing operating functions present between the internal combustion engine and the well-known Wankel rotary engine. Additionally, the reciprocating magneto-motive motor according to the instant invention starts with full power while the rotating electric motor presently well known gains power with increasing rpm. Moreover, the efficiency of the prior known electric motors increases with increase in rpm while the efficiency of the reciprocating magneto-motive motor according to the instant invention decreases with increasing rpm, so that it will be appreciated that the properties of the magneto-motive motor according to the instant invention are directly opposite to those possessed by the well-known electric motors.

The reciprocating magneto-motive motor according to the present invention can be assembled as a V-type motor, a radial type motor, and the like, and the number of electro-magnetically reciprocating pistons can be unlimited in number thus enabling the construction of huge power plants which function with a relative low electrical voltage. Moreover, the reciprocating magneto-motive motor is much to be preferred to the well-known internal combustion engines since it operates without generating unwanted pollution, it is quiet, it may be operated in any environment for example, in water, in temperatures such as those experienced in outer space, in high temperatures up to 600°C, and finally in a vacuum as well as in the presence of high explosive gases.

SUMMARY OF THE INVENTION

It is therefore an object of the present invention to provide a magneto-motive reciprocating device which obviates the disadvantages present in known devices utilizing permanent magnets and vicinal electro-magnetic fields.

It is a further object of the instant invention to provide a magneto-motive reciprocating motor which obviates the disadvantages present in such motors utilizing energy produced by the well known internal combustion engine.

The above and other objects of the instant invention have been attained due to the provision of a device which in its basic aspects comprises two magnets having high magnetic retentivity such as the cobalt rare-earth type, rigidly arranged opposing one another so that the poles of one magnet face the poles of the other magnet at a pre-determined distance to form an enclosed space therebetween, which facing poles are of opposite magnetic polarity. Thus, a fully closed ring-type flux field is produced which cannot be demagnetized under a given condition of operation. An electro-magnetic generating means is disposed between the two magnets so as to encircle the enclosed space and generates a magnetic flux field perpendicular to the air gap of the ring flux field of the spaced magnets and thus magnetizes one permanent magnet depending upon the direction of the field generated therein thereby keeping the permanent magnets at their magnetic saturation point and preventing a possible degradation of magnetic field strength. A reciprocating piston means is disposed within the enclosed space between the two magnets and becomes magnetically polarized by the applied field of the generating means. When this occurs, the piston is attracted to that magnet having the appropriate polarized faces. A field reversing means is operatively associated with the piston and the generating means for continuously reversing the current in the generating means and thus its field which results in the piston reversing its magnetic polarization and being attracted to the other magnet. Thus, it will be appreciated that the reciprocating piston means perform a reciprocating motion within the space between the two magnets on a continuous basis commensurate with the continuous reversal of the field of the generating means.

BRIEF DESCRIPTION OF THE DRAWINGS

Other and further objects of the present invention will become more apparent from the following detailed description of the various embodiments thereof when taken with reference to the appended drawings in which like characters refer to like structure and in which

FIG. 2 shows a sectional view of the reciprocating magneto-motive motor according to the instant invention having two magneto-motively operated piston chambers, arranged in V-shaped relationship;

FIG. 3 shows a further embodiment of the instant invention comprising an opposed piston-type magneto-motive motor employed as a multi-wire blade reciprocating saw;

DETAILED DESCRIPTION OF PREFERRED EMBODIMENTS

Figure 1:
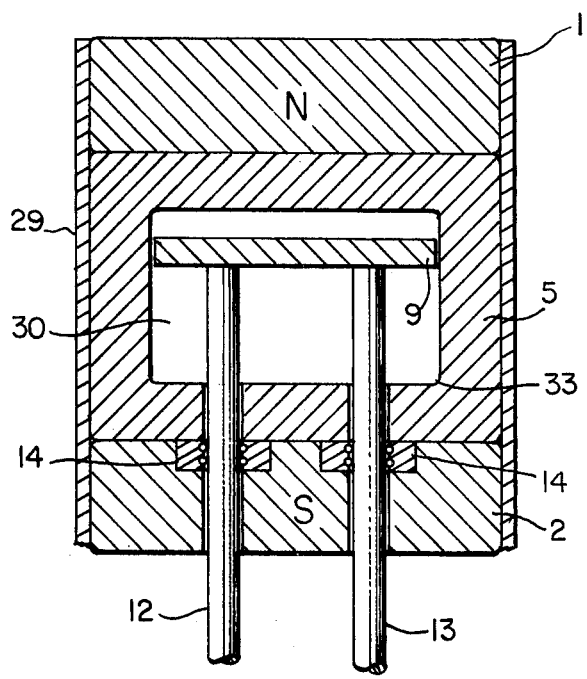
FIG. 1 shows a side sectional view of the magneto-motive reciprocating device according to the instant invention.

As illustrated in FIGS. 1 through 5 of the instant Specification, the present invention comprises at least two cobalt rare-earth type permanent magnets 1 and 2 rigidly disposed facing one another so that the poles of one magnet face the poles of the other which have opposite magnetic polarity. Thus, a closed ring flux field is produced which cannot be demagnetized under a given condition of operation of the device of the instant invention. The two magnets are rigidly mounted into the piston chamber 30 at a given distance between them so that an enclosed space is provided therebetween. A ferro-magnetic piston 8 is provided in the enclosed space and is able to reciprocably move between the two magnets. An electro-magnetic coil 5 is provided within the piston chamber and is so arranged that it totally surrounds the piston 9, see FIG. 1. Under the action, therefore, of the field produced by the electromagnetic coil, the piston 9 is magnetically polarized and is attracted to one of the magnets and repelled from the other. When the piston reaches the attracting magnet, the field in the coil is reversed and the piston is consequently attracted by the other magnet so that it reciprocably moves within the chamber.

In the embodiment of the invention as shown in FIG. 2, each piston chamber 30 has four magnets pair-wise arranged therein so that complementary poles of each pair face each other across a predetermined distance to form enclosed spaces. Each enclosed space contains a ferro-magnetic piston 9 which are interconnected by non-ferromagnetic guiding rods 12 and 13 movably passing through the permanent magnets 2 and 3. Magnets 2 and 3 are magnetically isolated from one another by the partition or shield 11. Disposed on top of each piston chamber 30 is a current reversing device 28 which operates to reverse the current in the electro-magnetic coils 5 and thus the direction of their magnetizing fields. The device 28 which may be called a commutator, has bridging brush contacts 24 and 25, and 26 and 27. Contacts 25 and 24 supply current in one direction while brush contacts 26 and 27 supply current in the other direction. A contacting rod 31 is fixed to the uppermost ferro-magnetic piston 9 and is movably disposed through the topmost magnet 1 to operatively engage the brush contacts during reciprocatory movements of the piston 9. Thus, when the piston 9 and consequently piston 10 are adjacent the pole faces of the magnets 1 and 3 respectively, then contacting rod 31 operatively makes contact with an appropriate pair of brush contacts to thus reverse the field in the electro-magnetic coil 5, thus reversing the magnetic polarity of the pistons. Thus, it will be seen that the pistons 9 and 10 form reciprocating motions in unison in their respective chambers by virtue of interconnecting guiding rods 12 and 13 moving on ball bearings 14 suitably disposed as shown.

Connecting rod 16 is povotally connected at bearing 15 to lower piston 10 and a similar connecting rod 20 is similarly connected to the lower piston of the opposing reciprocating chamber. The free ends of the connecting rods 16 and 20 are rotatably connected to big end bearing 17 which is connected to a crank-shaft 32. To the crank-shaft eye 18 there is attached a fly-wheel 19.

The V-type magneto-motive reciprocating motor according to the embodiment of the invention as shown in FIG. 2 is supplied with electric power through cables 33 and 34 disposed within a cable cover 33 and operates in the usual way to transmit energy to the crank-shaft 17 during reciprocatory motion of the opposing pistons.

FIG. 3 illustrates an application of the magneto-motive reciprocating motor to a multi-wire blade reciprocating saw. The two motors 51 and 52 are set up in opposed relationship so that under operation the saw reciprocates therebetween. The pistons are connected in series so that only one piston is pulling at the wires at a time. FIG. 3 shows the main frame 35 rigidly holding the two motors 51 and 52 in opposed relation, while component 36 is the saw-holding frame each component being suitably attached to the non-ferromagnetic guiding rods 12 and 13 of each of the motors 51 and 52.

Figure 4:
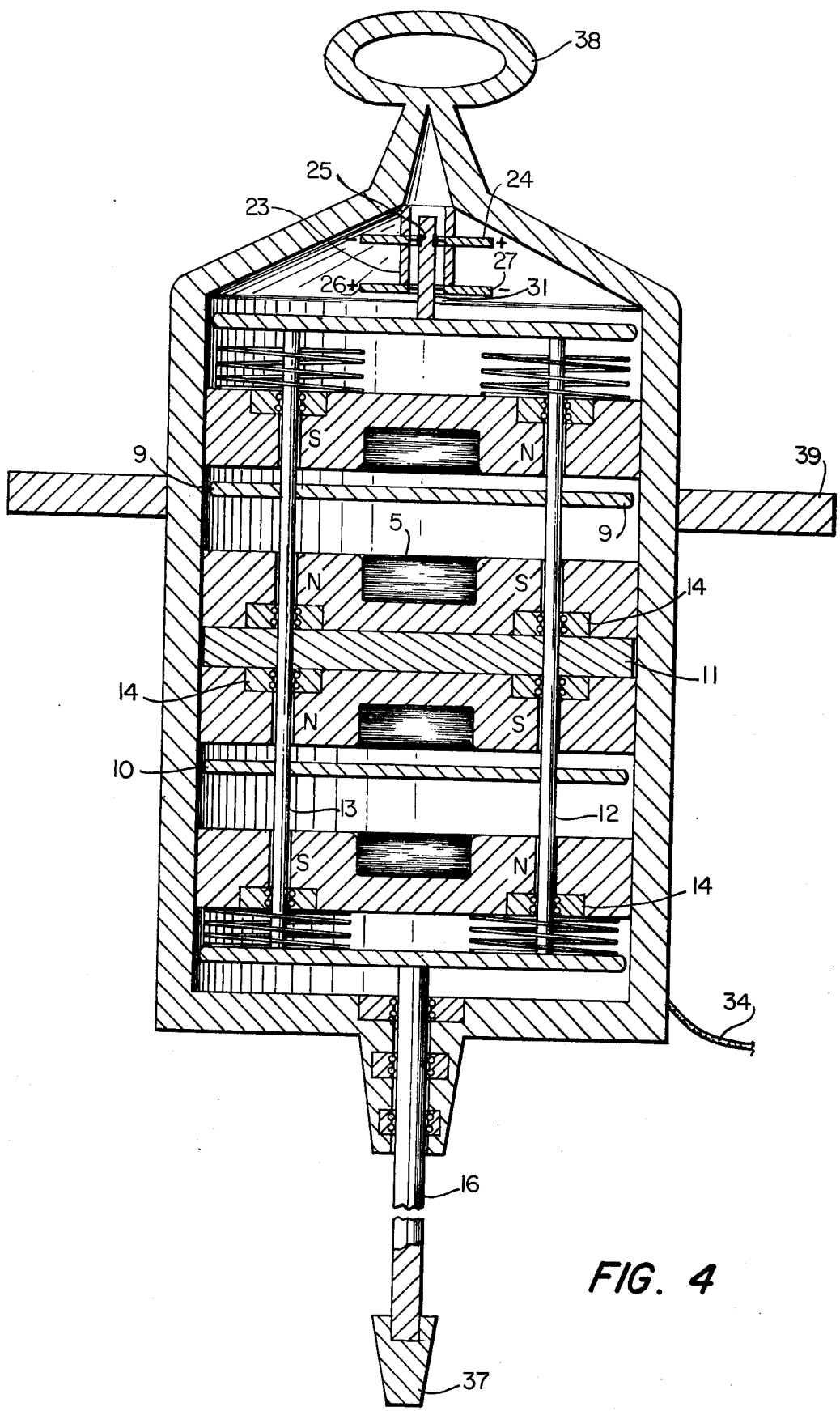
FIG. 4 shows a further embodiment of the instant invention where the magneto-motive reciprocating device according to the instant invention is employed to drive an impact tool.

FIG. 4 illustrates a further embodiment of the instant invention wherein the reciprocating magneto-motive motor is used to drive an impact tool such as a jack-hammer. The hand bar of the jack-hammer is shown at 39 while the handle is shown at 38. The connecting rod 16 has a working tool 37 attached thereto which working tool is interchangeable with others of a similar type.

Figure 5:
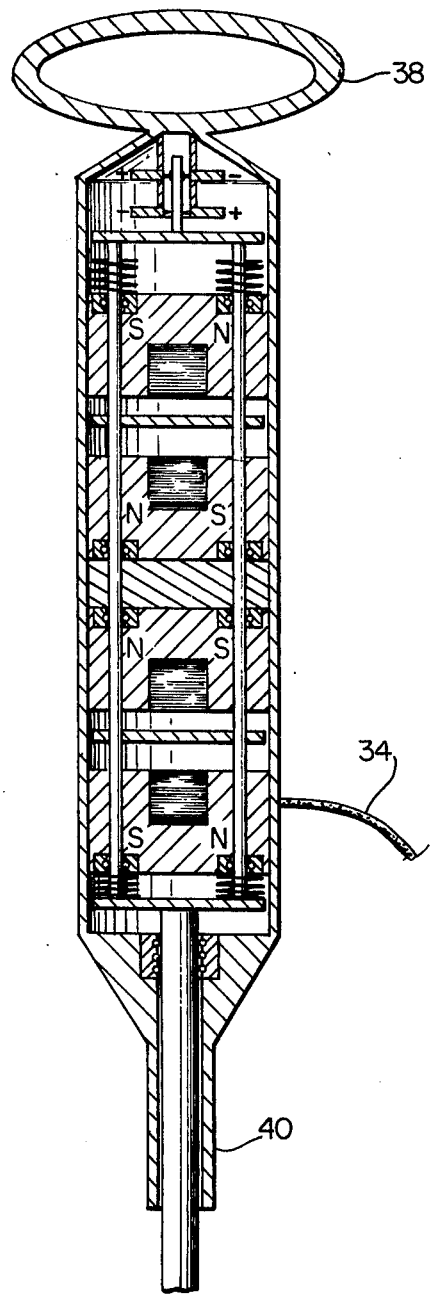
FIG. 5 is another embodiment of the instant invention showing a miniature-type impact tool comprising the structural features shown in FIG. 4.

In FIG. 5, a miniature jack-hammer has been illustrated to demonstrate the versatility as far as size is concerned of the instant inventive concept and its application.

It will be manifestly appreciated by those skilled in the art that the magneto-motive reciprocating motor according to the instant invention can be employed for driving various devices. For example, the small hammer shown in FIG. 4 can be used with exchangeable tools such as a rivetting hammer, a jack-hammer, a saw, hedging shears, a chisseling hammer, a percussion drill, a batting hammer, a percussion press, percussion screwdriver, percussion screw tightner, and a percussion punching, stamping and cutting device. It will be understood therefore that the various embodiments herewith described and disclosed have only been shown by way of examples and other and further modifications of the invention may be made without avoiding the spirit or scope thereof.

What is claimed is:

1. A magneto-motive reciprocating device having a reciprocating chamber and comprising:
   at least two permanent magnets rigidly mounted within said chamber so that both the poles of one magnet face both the poles of the other across a given distance and gap to form an enclosed space therebetween, said facing poles being of opposite magnetic polarity, said oppositely poles magnets producing a closed ring flux field;
   generating means for generating an electromagnetic field in direction substantially perpendicular to the gap within said enclosed space between said two magnets;

reciprocating means disposed in the gap within said enclosed space and being magnetically polarizable by the applied field of said generating means;

field reversing means operatively associated with said reciprocating means and said generating means for continuously reversing the field of said generating means and hence the magnetic polarization of said reciprocating means whereby said reciprocating means is alternately attracted towards an appropriate respective one of said magnets and repelled away from the other so as to reciprocably move theretween.

2. A device as claimed in claim 1 wherein said permanent magnets are of the cobalt rare-earth type.

3. A device as claimed in claim 1 wherein said field reversing means comprises a contacting rod connected to said reciprocating means; switch means having brush-contacts and operatively associated with said generating means for reversing the direction of the current fed thereto, said contacting rod engaging appropriate ones of said brush contacts at the completion of a stroke of said reciprocating means to thus cause reversal of current fed to said generating means and precipitate another stroke of said reciprocating means to complete a reciprocating movement thereof.

4. A device as claimed in claim 1 wherein at least two connecting rods are connected to said reciprocating means and movably project exteriorly of said chamber.

5. A device as claimed in claim 4, further including an additional assembly of permanent magnets, generating means, field reversal means, and connecting rods disposed in spaced-apart back-to-back relationship so that the connecting rods of each device face one another across the space; a working tool fixedly attached to opposing ones of said connecting rods and being reciprocably movable therewith during appropriate reciprocable movements of said reciprocating means within each of said devices.

6. An apparatus as claimed in claim 5 wherein said working tool comprises a multi-wire blade saw.

7. A magneto-motive reciprocating motor having at least two reciprocating piston chambers disposed so as to be in interworking relationship and comprising:

a plurality of permanent magnets rigidly disposed in pairwise array within each of said chambers, each pair having the magnetic poles thereof facing each other at a given distance to form an enclosed space therebetween;

means disposed between each adjacent pair of said permanent magnets for effecting magnetic shielding;

generating means for generating an electro-magnetic field enspherically disposed between each said pair of magnets with respect to the formed space therebetween;

reciprocating piston means disposed in each said enclosed space formed between each pair of magnets and being magnetically polarizable by the applied field of said generating means;

field reversing means operatively associated with each of said piston chambers for continuously reversing the field of each generating means disposed between each said pair of magnets and hence the magnetic polarization of each correspondingly disposed one of said piston means, whereby each piston means in each of said enclosed spaces is alternately attracted by an appropriate respective adjacent magnet and repelled by the other so as to define upward and downward reciprocating strokes thereof;

at least one nonferromagnetic rod means movably interconnecting each of said piston means within each of said chambers so as to form a single movable piston therein;

connecting rods pivotally attached to each of said single movable pistons, the free ends of said rods being rotatably connected together at a crank-shaft disposed in interworking relationship therewith, so that as one of said single movable pistons performs an upward stroke within its respective piston chamber, the other piston performs a downward stroke and said free ends movably rotate said crank-shaft connected thereto.

8. A device as claimed in claim 7 wherein said permanent magnets are of the cobalt rare-earth type.

9. A device as claimed in claim 7 wherein said field reversing means comprises: a contacting rod connected to said single movable piston; switch means having brush contacts and operatively associated with said generating means for reversing the direction of current fed thereto, said contacting rod engaging appropriate ones of said brush contacts at completion of a respective one of said upward and downward strokes to thus cause reversal of current fed to said generating means and precipitate the other of said upward and downward strokes.

10. A magneto-motive reciprocating impact device having at least one reciprocating piston chamber and comprising:

a plurality of permanent magnets rigidly disposed in pair-wise array within said chamber, each pair having the magnetic poles thereof facing each other at a given distance to form an enclosed space therebetween;

means disposed between each adjacent pair of said permanent magnets for magnetically isolating each adjacent pair of magnets from the other;

generating means for generating an electro-magnetic field enspherically disposed between each said pair of magnets with respect to the formed enclosed space therebetween;

reciprocating piston means disposed in each said enclosed space formed between each pair of magnets and being magnetically polarizable by the applied field of said generating means;

field reversing means operatively associated with said piston chamber for continuously reversing the field of each generating means disposed between each said pair of magnets and hence the magnetic polarization of each correspondingly disposed one of said piston means;

at least one nonferro-magnetic rod means movably interconnecting each of said piston means within said chamber so as to form a single movable piston;

a connecting rod attached at one end to said single movable piston the other end movably projecting exteriorly of said chamber, whereby under the action of said generating means and said field reversing means each piston means is alternately attracted by an appropriate respective adjacent magnet and repelled by the other so that said single movable piston performs reciprocating motion within said chamber which is thus transmitted to said connecting rod.

11. A device as claimed in claim 10 wherein said connecting rod has a working tool attached thereto which performs an impacting motion in unison with the reciprocating motion of said single movable piston.

12. A device as claimed in claim 10 wherein said permanent magnets are of the cobalt rare-earth type.

13. A device as claimed in claim 10 wherein said field reversing means comprises a contacting rod connected to said single movable piston; switch means having brush contacts and operatively associated with said generating means for reversing the direction of the current fed thereto, said contacting rod engaging appropriate ones of said brush contacts at completion of a working stroke thereof to thus cause reversal of current fed to said generating means and precipitate another working stroke of said single movable piston.

* * * * *